(12) United States Patent
Nakamura et al.

(10) Patent No.: US 8,490,457 B2
(45) Date of Patent: Jul. 23, 2013

(54) BENT METAL MEMBER AND A METHOD FOR ITS MANUFACTURE

(75) Inventors: Toyomitsu Nakamura, Amagasaki (JP); Atsushi Tomizawa, Minoh (JP); Naoaki Shimada, Osaka (JP); Nobusato Kojima, Amagasaki (JP); Kazuya Ishii, Nishinomiya (JP); Kazuhito Imai, Amagasaki (JP); Tamotsu Toki, Nishinomiya (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 26 days.

(21) Appl. No.: 13/185,575

(22) Filed: Jul. 19, 2011

(65) Prior Publication Data

US 2012/0009435 A1   Jan. 12, 2012

Related U.S. Application Data

(63) Continuation of application No. PCT/JP2010/050637, filed on Jan. 20, 2010.

(30) Foreign Application Priority Data

Jan. 21, 2009   (JP) .................................. 2009-011162

(51) Int. Cl.
*B21D 9/00* (2006.01)
(52) U.S. Cl.
USPC ................................. 72/369; 72/47; 72/342.5
(58) Field of Classification Search
USPC ............ 72/47, 128, 163, 342.1, 342.5, 342.6, 72/369
See application file for complete search history.

(56) References Cited

U.S. PATENT DOCUMENTS

| 1,552,040 | A | * | 9/1925 | Fowle et al. | 428/659 |
| 1,891,338 | A | * | 12/1932 | Snell | 72/128 |
| 3,259,148 | A | * | 7/1966 | Krengel et al. | 138/145 |
| 3,902,344 | A | * | 9/1975 | Stuart | 72/128 |
| 4,358,887 | A | * | 11/1982 | Creps | 29/527.4 |
| 4,414,833 | A | * | 11/1983 | Nicolas et al. | 72/19.1 |
| 5,491,996 | A | * | 2/1996 | Baarman et al. | 72/128 |

FOREIGN PATENT DOCUMENTS

| JP | 63-67526 | 12/1988 |
| JP | 64-068456 | 3/1989 |
| JP | 03-55544 | 8/1991 |
| JP | 4-500236 | 1/1992 |
| JP | 2000-064013 | 2/2000 |
| JP | 2000-248338 | 9/2000 |
| JP | 2001-353548 | 12/2001 |

(Continued)

*Primary Examiner* — Edward Tolan
(74) *Attorney, Agent, or Firm* — Clark & Brody

(57) ABSTRACT

A method of manufacturing a bent metal member comprises supporting the outer surface of a tubular metal material having a Zn-Fe alloy coating layer at two locations spaced in the axial direction of the metal material. The metal material is fed in its axial direction and heated at a position between the two locations to a temperature range of at least the $Ac_3$ point at a heating speed such that the rate of temperature increase is at least $3.0 \times 10^{2 \circ}$ C. per second, held so that the time for which the surface of the metal material is at a temperature of $8.0 \times 10^{2 \circ}$ C. or higher is at most 2 seconds, and then rapid cooled. A bending moment is imparted to the healed portion in two or three dimensions to manufacture a bent metal member having on its surface a Zn-based layer which contains an $\eta$, phase.

1 Claim, 4 Drawing Sheets

FOREIGN PATENT DOCUMENTS

| | | |
|---|---|---|
| JP | 2003-073774 | 3/2003 |
| JP | 2006-097102 | 4/2006 |
| JP | 2008-069398 | 3/2008 |
| JP | 2009-297736 | 12/2009 |
| WO | 2006/093006 | 9/2006 |

* cited by examiner

BENT METAL MEMBER AND A METHOD FOR ITS MANUFACTURE

TECHNICAL FIELD

This invention relates to a bent metal member and a method for its manufacture. Specifically, the present invention relates to a high-strength bent metal member which is manufactured by bending accompanied by heat treatment of a zinc-based coated metal material and which has a high strength and excellent post-painting corrosion resistance (corrosion resistance after painting) which make it suitable for use as an automobile part. This invention also relates to a method for its manufacture.

BACKGROUND ART

Out of concern for the global environment, there has been a demand in recent years that steel structural members for automobiles have a light weight and a high strength. Techniques for increasing impact energy absorbing ability are also being developed in order to increase the safety of automobile bodies in collisions.

For example, metal tubes such as steel tubes are used as beams for reinforcing doors in order to increase safety during side impacts. The impact energy absorbing ability of door reinforcing beams is increased by giving a metal tube a bent shape. The impact energy absorbing ability of a center pillar reinforcing member is improved by optimizing the shape and curvature of the reinforcing member. Various techniques are being employed for bending steel tubes (in this description, steel tubes include not only usual steel tubes such as welded steel tubes but also members produced by forming a steel sheet into a tubular shape) into an optimal shape for automotive parts.

There is a strong demand for an increase in the tensile strength of automotive parts in order to decrease the weight of automotive bodies. High-strength steel materials having a high strength level such as, for example, a tensile strength of at least 780 MPa or even at least 900 MPa, which is completely different from that used in the past, are being widely used.

It is difficult to carry out bending of a steel material made from a high tensile strength steel in a cold state. Furthermore, bending of a steel material made from a high tensile strength steel in a hot state is also difficult because non-uniform strains develop in the steel material, which causes the shape of a bent product to fluctuate, and shape retention is inadequate. Furthermore, there is a strong demand for the development of bending techniques which can manufacture with high accuracy a steel member having various bent shapes such as a bent shape in which the bending direction varies two-dimensionally or three-dimensionally.

In PCT/JP2006/303220, the present applicant disclosed an apparatus for manufacturing a bent member. That apparatus (a) supports a material being worked at two locations spaced from each other in the axial direction of the material so that the material can move in its axial direction, (b) it feeds the material being worked in the axial direction of the material, (c) it rapidly heats the material being worked with an induction heating coil between the two locations where the material being worked is supported to a temperature at which plastic working of the material is possible and at which the crystal grains of the material do not coarsen, (d) it cools the heated material being worked with a cooling device, and (e) it two-dimensionally or three-dimensionally varies the position of a movable roller die which supports the material being worked at the downstream in the feed direction of the material being worked of the two locations where the material being worked is supported whereby a bending moment is imparted to the high temperature portion of the material being worked and this portion is plastically deformed.

It is economical to carry out induction heating of the material being worked by that apparatus in air. Steel members used in automotive parts basically undergo chemical conversion treatment and electrodeposition coating. In order to increase corrosion resistance, automobile parts are made from a zinc-based coated steel material.

Accordingly, by using zinc-based coated steel as the material being worked by that apparatus, it is not only possible to prevent oxidation of the material being worked but it is also possible to manufacture a bent member or a quench hardened member having excellent corrosion resistance. Therefore, it is possible to widely employ a material which has been worked by that apparatus in automobile parts.

However, when a zinc-based coated steel material is heated to at least the $A_1$ transformation point or even to at least the $A_3$ transformation point, the performance of the coating layer may deteriorate. This is because the vapor pressure of Zn suddenly rises with an increase in temperature, as exemplified by the fact that the vapor pressure is 200 mm Hg at 788° C. and 400 mm Hg at 844° C. As a result, Zn may vaporize during a heating step.

A manufacturing method for a member which is strengthened by high frequency quench hardening is disclosed in Patent Document 1 as a technique for heat treatment of a zinc-based coated steel sheet. In that method, a galvanized steel sheet for high frequency hardening is heated to a quench hardening temperature of at least the $Ar_3$ point and at most 1000° C. and then cooled with the interval from the start of heating until cooling to 350° C. being restricted to at most 60 seconds. Patent Document 1 discloses that even if a hot-dip zinc-based coated steel sheet having a base steel sheet for quench hardening is used as a material to be strengthened by high frequency hardening and high frequency quench hardening is carried out on a portion which is to be increased in strength, a coating layer remains on the quench hardened portion, and the Fe concentration in the coating layer can be restricted to at most 35% (in this description, unless otherwise specified, % means mass %). Therefore, a member for automobiles having excellent coatability and corrosion resistance is obtained.

Patent Document 2 and Patent Document 3 disclose methods in which a material being worked made of a zinc-based coated steel sheet is heated for several minutes at 700-1000° C., for example, and hot pressing is carried out.

Prior Art Documents

Patent Documents

| | |
|---|---|
| Patent Document 1: | JP 2000-248338 A |
| Patent Document 2: | JP 2001-353548 A |
| Patent Document 3: | JP 2003-73774 A |

SUMMARY OF THE INVENTION

Problem which the Invention is to Solve

The nature of a coating layer which is desired to exist on the surface of a steel member after heat treatment vary in accordance with the use of the steel member. However, a coating layer having a pure zinc phase (η-Zn phase), which electrochemically has a base potential, is advantageous when it is desired for a coating layer to have good sacrificial corrosion protecting properties. Patent Document 1 discloses only that the Fe content of the coating layer of a heat treated material is at most 35%.

In the methods disclosed in Patent Documents 2 and 3, if the residence time at a heating temperature is long, mutual diffusion between the elements of the coating layer and the steel in the substrate progresses. As a result, an intermetallic compound phase having a high Fe concentration or a solid solution phase in which Zn is dissolved in α-Fe is formed on the surface of the heat-treated steel material.

Means for Solving the Problem

The method disclosed in above-mentioned International Application No. PCT/JP 2006/303220 is a novel process in which plastic deformation is imparted to a material being worked during heating without the material contacting a die, rapid cooling is then performed, and then the material passes through a movable roller die. That method is different from the methods disclosed in Patent Documents 2 and 3 (hot pressing in which a material being worked is heated and then interposed between a die and a press to undergo plastic deformation, and then cooled in the die) or the method disclosed in Patent Document 1 (so-called high frequency heating and hardening in which a material being worked undergoes quench hardening treatment by simply being heated and cooled without undergoing plastic deformation).

If the method disclosed in International Application No. PCT/JP2006/303220 is possible to manufacture a heat treated material having a coated layer with an η-Zn phase close to pure zinc on its surface even after heat treatment, it can provide a desired bent metal member and a method for its manufacture.

For this purpose, it is conceivable to use a steel material having a pure zinc coating (specifically, a hot-dip galvanized steel material or an electrogalvanized steel material) as a material to undergo heat treatment. However, a pure zinc phase has a low melting point, so during heating, the surface becomes a liquid phase, and defects such as dripping easily develop in the appearance of the steel material after cooling. In addition, it is difficult to eliminate the above-described vaporization of zinc.

Even when a steel material having a Fe—Zn based alloy coating with an Fe content of around 10% (specifically, a galvannealed coating) is used as a material to be heat treated, it is thought that a liquid phase is formed when the steel material is heated to a temperature exceeding approximately 660° C. at which the Γ phase ($Fe_3Zn_{10}$) decomposes in a phase diagram.

However, when such a steel material is rapidly heated and then immediately thereafter rapidly cooled, the period of residence in a heating temperature range including both heating and cooling stages is extremely short, and the time for which diffusion progresses is short. Therefore, in the solidification stage, it is thought that the liquid phase solidifies while discharging an intermetallic compound phase having a high Fe content which has a high melting point, and as a result, solidification takes place such that an η phase having an extremely low Fe content is present. Since the decomposition temperature of a Γ phase is higher than the melting point of a pure zinc phase, it is thought that the entirety of the coating layer does not become Zn, and it becomes difficult for dripping or consumption by vaporization of the coating layer to develop.

By employing such rapid heating and rapid cooling conditions in the manufacturing method for a bent member disclosed in International Application No. PCT/JP2006/303220, it is possible to continuously carry out working and heat treatment without contacting the surface of a steel material in a liquid state with a die such as takes place in hot pressing. The present invention is based on such findings.

The present invention is a method of manufacturing a bent metal member characterized by supporting the outer surface of a tubular metal material having a Zn—Fe alloy coating layer which satisfies below-described Condition 1 on its surface at two locations spaced in the axial direction of the metal material so that the material can move in the axial direction, heating the metal material at a position between the two locations while feeding it in its axial direction to a temperature range of at least the $Ac_3$ point and preferably at least the $Ac_3$ point to at most $9.5 \times 10^2$° C. at a heating speed of at least $3.0 \times 10^2$° C. per second and cooling it after holding the temperature of the metal material such that the length of time for which the surface of the metal material is at a temperature of $8.0 \times 10^2$° C. or higher is at most 2 seconds, and two-dimensionally or three-dimensionally varying one of the two locations which is located downstream in the feed direction of the metal material, thereby imparting a bending moment to the heated portion of the metal material to manufacture a bent metal member having on its surface a Zn-based layer which contains an η phase and which satisfies the following Condition 2:

(Condition 1)
Coating weight: 30-90 g/m² per side
Fe content: 8-20%
Surface roughness Ra prescribed by JIS B 0601: At most 0.8 μm;
(Condition 2)
Coating weight: At most 90 g/m² per side
Fe content: At most 8-35%
Surface roughness Ra prescribed by JIS B 0601: At most 2.0 μm.

From another standpoint, the present invention is a bent metal member having a body which is made from a tubular metal material and which has a shape which is bent two-dimensionally or three-dimensionally, characterized in that the surface of the body has a Zn-based layer which contains an η phase and which satisfies above-described Condition 2. Examples of the bent metal member are members having a closed cross section, an open cross section, or a shaped cross section.

Effects of the Invention

According to the present invention, a bent metal member which is obtained by carrying out bending accompanied by heat treatment of a zinc-based coated metal material and which is suitable for use as a component of automobiles and the like due to having a high strength and excellent post-painting corrosion resistance and a method for its manufacture can be provided.

Specifically, according to the present invention, it is possible to use a zinc-based coated steel material as the material being worked even when carrying out in air the method disclosed in International Application No. PCT/JP2006/303220, namely, a method of manufacturing a bent member by supporting a material being worked at two locations spaced in the axial direction of the material being worked so that the material being worked can move in its axial direction, rapidly heating and cooling the material being worked at a position between the two locations where the material being worked is supported while feeding the material in its axial direction, and two-dimensionally or three-dimensionally varying the position of one of the two locations which is located downstream in the feed direction of the material being worked to impart a bending moment to the heated portion of the material being worked.

Figure 1:
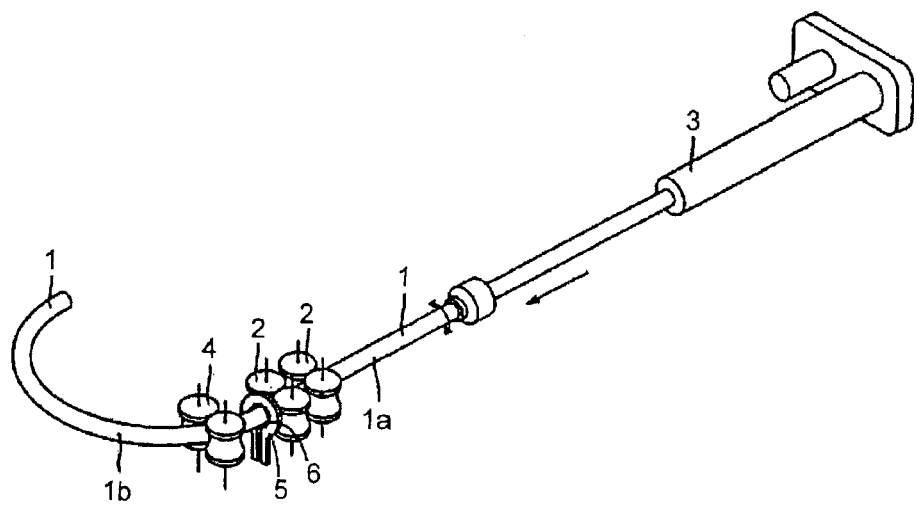
FIG. 1 is an explanatory view showing an example of the structure of a manufacturing apparatus for carrying out a method of manufacturing a bent metal member.
Figure 2:
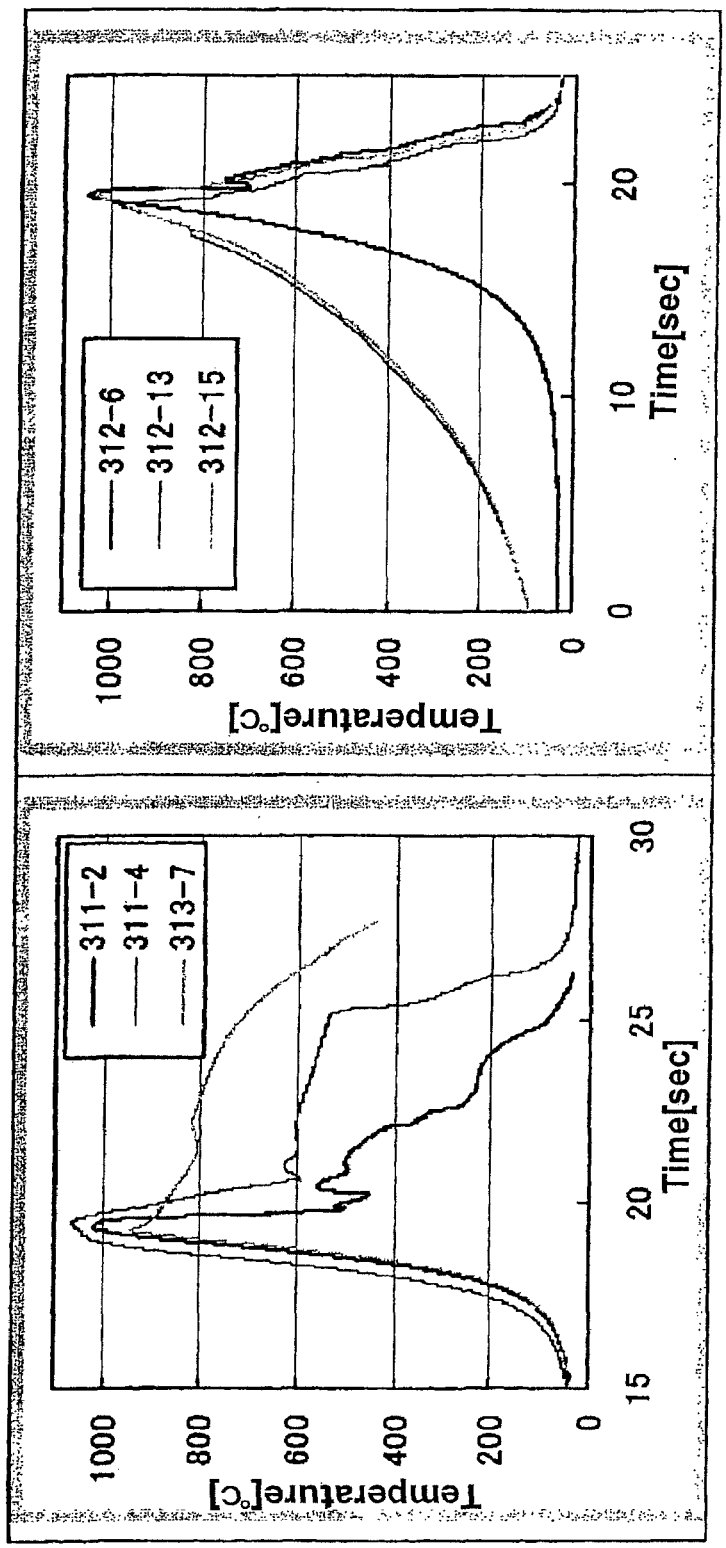
FIG. 2 shows graphs of heating patterns of test materials.

| Explanation of Symbols | |
|---|---|
| 1 | material being worked |
| 1a | zinc-based coated steel material |
| 1b | zinc-based coated heat treated steel material |
| 2 | support rolls |
| 3 | feed device |
| 4 | movable roller die |
| 5 | induction heating coil |
| 6 | cooling device |

EMBODIMENTS OF THE INVENTION

Below, preferred embodiments of a bent metal member and a method for its manufacture according to the present invention will be explained while referring to the accompanying drawings.

The present invention is highly practical in that a heat treated steel member is obtained by carrying out hot bending and quench hardening at approximately the same time on a zinc-based coated steel material which is in the form of a steel tube or the like manufactured from a base steel sheet (sometimes referred to below as a starting sheet). A steel tube includes not only a welded steel tube but also one which is formed into a tubular shape by roll forming or the like. The cross-sectional shape of the steel tube is not limited and may be circular, polygonal, or the like.

The present invention will be explained in the order of the steps in a bending process.

(i) Steel Material Before Heating (Starting Sheet)

(a) Coating Layer (Coating Weight, Fe Content)

A tubular metal material which is used as a material being worked is rapidly heated so that, as described below, the peak metal temperature is at least the $Ac_3$ point (the $Ac_3$ point depends upon the type of steel, but for practical purposes it is at least approximately 850° C.). It is conceivable that a slight amount of Zn evaporates during the heating process. It is preferable to leave a coating weight of at least 5 g/m² in order to guarantee adequate corrosion resistance after heat treatment. It is more preferable to leave a coating weight of at least 10 g/m² and still more preferable to leave a coating weight of at least 20 g/m². For this purpose, the starting sheet prior to working preferably has a certain amount of coating adhered thereto.

If the coating weight is too great, the amount of liquid phase increases during heating, and defects in the appearance such as so-called dripping can easily develop in the steel material after cooling. It is desirable to increase the melting point of the coating layer by previously forming an alloy coating layer.

From these standpoints, the coating weight on a material being worked in the form of a tubular metal material is preferably 30-90 g/m² and a more preferred coating weight is 40-70 g/m². The coating layer is preferably a Zn—Fe alloy coating layer (preferably a galvannealed coating layer) containing 8-20% of Fe rather than pure zinc coating.

The zinc coating layer may contain Al. A preferred Al content is at most 0.45%. If the Al content of the coating layer is too high, the Fe—Zn alloying reaction during the heating step becomes nonuniform and the surface roughness after cooling can easily become too high.

(Surface Roughness of the Coating Layer)

The surface of a bent metal member is preferably smooth. The surface roughness affects the ability of the member to undergo degreasing and chemical conversion treatment. For example, it is thought that when a rust preventing oil is applied to a heat treated material, the rust preventing oil enters into irregularities formed on the surface of the heat treated material. It is advantageous for the surface of a bent metal material to be smooth in order to guarantee good degreasing ability. It is advantageous for a bent metal member to have a smooth surface from the standpoints of the appearance after painting and post-painting corrosion resistance (resistance to blistering of a painted coating and the like).

A low surface roughness of a bent metal member after heat treatment can easily be achieved by making the surface roughness of the coating layer on the metal material before heat treatment as low as possible. In particular, when a galvannealed steel sheet is used as a starting sheet, microscopic non-uniformities in alloying of Fe—Zn at the time of alloying treatment affect the surface roughness, so the surface roughness before heat treatment is preferably made as low as possible. A target surface roughness of the metal material is preferably a surface roughness Ra prescribed by JIS B 0601 of at most 0.8 µm. Examples of methods of decreasing the surface roughness Ra are skin pass rolling of a galvannealed steel sheet and decreasing the surface roughness by the below-described tube forming or roll forming or the like.

It is expected that the present invention can exhibit an advantageous effect on corrosion resistance by forming a coating having an η phase. As stated above, because a coating formed by a heat treatment process according to the present invention has undergone the formation of liquid phase, surface irregularities are smoothed and the appearance after painting and post-painting corrosion resistance (difficulty of forming blisters in the painted layer and the like) are improved.

(b) Steel Composition

The base steel of a galvannealed steel material used in the present invention preferably has a steel composition which is quench hardenable even when heated to a temperature of not higher than 1050° C. By having such a steel composition, working can be easily carried out in a tube-forming stage and the like on a steel in its low-strength state, and then the strength can be increased by subsequent quench hardening to obtain a desired high strength. Such a steel composition is exemplified by a steel composition of a hardenable steel which comprises C: 0.1-0.3%, Si: 0.01-0.5%, Mn: 0.5-3.0%, P: 0.003-0.05%, S: at most 0.05%, Cr: 0.1-0.5%, Ti: 0.01-0.1%, Al: at most 1%, B: 0.0002-0.004%, N: at most 0.01%, a remainder of Fe and impurities, and if necessary, one or more of Cu: at most 1%, Ni: at most 2%, Mo: at most 1%, V: at most 1%, and Nb: at most 1%.

(c) Forming Before Heat Treatment

Before carrying out the below-described bending, a starting sheet as described above is formed into a shape such as a steel tube. A typical formed shape is a UO tube which undergoes UO forming and then seam welding, but the present invention is not limited to a UO tube. Depending on the use and bent shape, members having a closed cross section with a cross-sectional shape such as a circle, a rectangle, a trapezoid, or the like, members with an open cross section (channels) manufactured by roll forming or the like, and members with a shaped cross section (channels) manufactured by extrusion can be used as the formed shape. Tapered steel members having a cross-sectional area which continuously varies can also be used as a formed shape.

(ii) Heating-Hot Bending-Cooling

The outer surface of a tubular metal material having a Zn—Fe alloy coating layer as described above is supported at two locations spaced in the axial direction of the metal material so that the material can move in its the axial direction. The metal material is fed in its axial direction.

The metal material is heated at a position between the two locations to a temperature range of at least the $Ac_3$ point and preferably a temperature range from the $Ac_3$ point to 950° C. at a rate of temperature increase of at least 300° C. per second.

The metal material is held so that the length of time for which its surface is at a temperature of 800° C. or higher is most 2 seconds. The metal material is then rapidly cooled.

A bending moment is applied to the high temperature portion of the metal material by two-dimensionally or three-dimensionally varying the position of one of the two locations which is located downstream in the feed direction of the metal material.

(a) Heating Pattern (Heating Temperature, Cooling Speed, Holding Time)

The metal material is heated to a temperature range of at least the $Ac_3$ point and preferably from the $Ac_3$ point to 950° C. The heating pattern for heating is a rate of temperature increase at the time of heating of at least 300° C. per second, a holding time at which the surface of the metal material is at least 800° C. being at most 2 seconds, and a cooling speed of at least 400° C. per second, for example.

By employing this heating pattern, an alloying reaction between the coating layer and the steel is suppressed, and a coating containing an η phase is formed after heating since rapid cooling takes place after a liquid phase is present on the surface at the time of heating.

(Peak Metal Temperature During Heating)

The peak metal temperature at the time of heating is preferably not higher than 1150° C. If the heating temperature is too high, the amount of the coating remaining after cooling may become too small, and even if a coating remains, the surface of the coating becomes coarse. It is thought that a high heating temperature increases the amount of a liquid phase present on the surface whereby there is an increased loss of the coating due to vaporization and contact with a cooling medium.

As shown by the liquidus line in a Fe—Zn phase diagram, the temperature at which an alloy consisting of Zn and approximately 10% of Fe entirely melts is approximately 930° C. However, in the present invention, heating and cooling in this temperature range are rapid and the holding time is short. Therefore, it is thought that a coating remains even if heating is carried out to a temperature higher than the melting temperature in an equilibrium state.

(iii) Bending

By heating the metal material with a heating pattern as described above and two-dimensionally or three-dimensionally varying the position of the downstream of the two locations where the outer surface of the metal material is supported so that the material can move in its axial direction, a bending moment is imparted to the portion of the metal material which is at a high temperature.

FIG. 1 is an explanatory view showing an example of the structure of a manufacturing apparatus 0 for carrying out a method of manufacturing a bent metal member. In the example shown in FIG. 1, a metal material 1 which is a material being worked is a round tube which is made of zinc-based coated steel and which has a circular closed cross section.

As shown in FIG. 1, the outer surface of a zinc-based coated steel material 1*a* which is the material to be worked is supported at two locations A and B spaced in the axial direction of the metal material 1 so that it can move in its axial direction. The metal material 1 is fed in the axial direction. The metal material 1 is heated, held, and cooled with the above-described heating pattern between the two locations A and B, and the position of location B is two-dimensionally or three-dimensionally varied. In this manner, a bending moment is imparted to the portion of the metal material 1 which is at a high temperature, and this portion is plastically deformed.

For this purpose, the manufacturing apparatus 0 has a feed device 3 for the metal material 1, two sets of support roll pairs 2, 2, an induction heating coil 5, a cooling device 6, and a movable roller pair 4, 4 disposed in this order in the feed direction of the zinc-based coated steel material 1*a*. These components of the manufacturing apparatus 0 will next be explained.

The support roll pairs 2, 2 rotate while contacting the outer surface of the zinc-based coated steel material 1*a* which is being fed in its axial direction. As a result, the support roll pairs 2, 2 support the zinc-based coated steel material 1*a* so that it can move in its axial direction. In the illustrated example, two sets of support roll pairs 2, 2 are provided in the feed direction of the zinc-based coated steel material 1*a*.

The feed device 3 is disposed on the upstream side of the two sets of support roll pairs 2, 2. The feed device 3 continuously or intermittently feeds the zinc-based coated steel material 1*a* in its axial direction.

The movable roller pair 4, 4 is disposed on the downstream side of the two sets of support roll pairs 2, 2. The movable roller pair 4, 4 rotates while contacting the outer surface of the zinc-based coated steel material 1*a* which is being fed in its axial direction and thereby support the zinc-based coated steel material 1*a* so that it can move in its axial direction. The position of the movable roller pair 4, 4 can be two-dimensionally or three-dimensionally varied. In the illustrated example, the movable roller pair 4, 4 is rotatably mounted in an unillustrated casing.

The movable roller die includes the movable roller pair 4, 4. The movable roller die has a vertical shifting mechanism, a shifting mechanism for shifting to the left and right, a tilting mechanism for tilting in the vertical direction, and a tilting mechanism for tilting to the left and right. The movable roller die also has a mechanism for forward and backward movement. With this structure, the movable roller die moves while three-dimensionally positioning the zinc-based coated steel material 1*a*. By moving three-dimensionally, the movable roller die imparts a bending moment to the heated portion of the zinc-based coated steel material 1*a*.

The induction heating coil 5 is disposed between the two sets of support roll pairs 2, 2 and the movable roller pair 4, 4 and is spaced from the outer periphery of the zinc-based coated steel material 1a. The induction heating coil 5 heats the zinc-based coated steel material 1 which is being fed.

The cooling device 6 is disposed in the vicinity of the induction heating coil 5.

The cooling device 6 rapidly cools the zinc-based coated metal material 1a which was rapidly heated by the induction heating coil 5.

When a bent metal member is manufactured using this manufacturing apparatus 0, the zinc-based coated metal material 1a may undergo bending (heat treatment) over its entire length in the axial direction, or only necessary portions of the length may undergo bending (heat treatment) by locally carrying out bending. For example, when a bent metal member is a bumper reinforcing member for an automobile, it is not necessary to carry out bending and quench hardening over its entire length, and bending and quench hardening can be omitted at the end portions in the axial direction, for example.

In this manner, a bent metal member in the form of a zinc-based coated heat treated metal member is manufactured. A Zn-based layer which contains an η phase is formed on the surface of the bent metal member. This layer has a coating weight of at most 90 g/m² per side, an Fe content of 8-35%, and a surface roughness Ra prescribed by JIS B 0601 of at most 2.0 μm.

It can be ascertained whether an η phase is present by X-ray diffraction from the surface. A heat treated member having this layer has a metallic luster with a green tint. Its external appearance is totally different from the color (dark brown to black) of a heat treated material having scale formed on steel.

In this manner, a bent metal member is manufactured by performing bending accompanied by heat treatment on a zinc-based coated metal material. This bent metal member has a high strength and excellent post-painting corrosion resistance, so it is suitable for use as a component for automobiles and the like.

Therefore, it is possible to use zinc-based coated steel as a material being worked even when carrying out the method disclosed in International Application No. PCT/JP2006/303220 in air.

Example 1

A galvannealed steel sheet having the steel composition shown in Table 1 (sheet thickness of 2.3 mm, coating weight of 60 g/m², Fe content in the coating layer of 13%) underwent UO forming and then laser welding to prepare a tube with an outer diameter of 31.8 mm, a wall thickness of 2.3 mm, and a length of 2000 mm.

The surface roughness Ra of this tube was 0.56 μm on the outer surface and 1.44 μm on the inner surface.

Using the thus-prepared tube as a material being worked, heating, holding, and cooling were carried out under predetermined conditions using the manufacturing apparatus 0 shown in FIG. 1 to obtain a test material. Heating of the tube was carried out using a high frequency heater. Cooling was carried out by water cooling from the outer surface of the tube using a water cooling device provided immediately after the high-frequency heating device.

Table 2 shows the heat treatment conditions (rate of temperature increase, holding time, peak metal temperature) and the results of investigation of the surface condition.

The conditions were set by adjusting the output of the high frequency heating device, the feed speed of the steel tube, and the like, and the temperature was measured using a thermocouple attached to the outer surface of the tube. The rate of temperature increase was calculated from the time required for heating from 200° C. to the peak metal temperature reached, and the holding time was the holding time in a temperature range of 800° C. or higher. The surface condition was investigated with respect to the following categories.

1) Visual Observation

The surface of the steel after heat treatment was visually observed to evaluate the extent to which a coating layer remained.

Specimens having a metallic luster with a greenish tint were evaluated as good (CIRCLE), specimens in which the color of the coating turned black but scale was not observed were evaluated as good (TRIANGLE), and specimens in which the color became dark brown or black, the coating disappeared, and scale developed were evaluated as poor (X).

2) Observation of Cross Section

For some of the heat treated materials, the condition of the surface layer was evaluated by observing a cross section with a SEM.

3) Phase Structure of Coating (Presence or Absence of an η Phase)

Specimens for which a peak of an η-Zn phase (00·2) plane was detected by X-ray diffraction of the surface of a heat treated rectangular tube were determined to have an η phase.

4) Surface Roughness Ra

The surface roughness Ra of the coating layer of a heat treated rectangular tube was measured in accordance with the specifications prescribed by JIS B 0601 using a SURFCOM instrument manufactured by Tokyo Seimitsu Co., Ltd. with a cut-off value of 0.8 mm. The measuring apparatus used was a SURFCOM 1900DX, and the probe (contact needle) was a model E-DT-SS01A. At the time of measurement, roughness reference specimens (E-MC-S24B manufactured by Tokyo Seimitsu Co., Ltd.) were used, and it was confirmed that the measured value of the surface roughness Ra of the reference specimen with Ra 3.18 μm was in the range of ±2% of the

TABLE 1

| Steel type | C | Si | Mn | P | S | sol. Al | N | Ti | Calculated Ac₃ |
|---|---|---|---|---|---|---|---|---|---|
| Test material | 0.21 | 0.23 | 1.22 | 0.01 | 0.002 | 0.037 | 0.0028 | 0.028 | 791° C. |

Formula for calculating $Ac_3$: $910 - 203(C)^{1/2} + 44.7Si - 30Mn$, wherein C, Si, and Mn indicate the mass % of these elements in the chemical composition.

nominal roughness (3.12-3.24 μm), and the measured value of the surface roughness Ra of the reference specimen with Ra 0.41 μm was in the range of 0.38-0.44 μm.

TABLE 2

| Mark | Rate of temp. increase (° C./sec) | Holding time (sec) | Peak metal temp. reached | Appearance* | η phase | Roughness Ra (μm) | Remark |
|---|---|---|---|---|---|---|---|
| Range of invention | At least 300 | at most 2.0 | at least Ac₃ | | yes | At most 2.0 | |
| 311-2 | 532 | 0.7 | 1024 | Circle | yes | 1.64 | Inventive |
| 311-4 | 419 | 1.6 | 1066 | Triangle | no | 2.83 | Compar. |
| 313-7 | 535 | 3.9 | 942 | X | no | 3.48 | Compar. |
| 312-6 | 201 | 1.2 | 1066 | X | no | 3.00 | Compar. |
| 312-13 | 61 | 2.0 | 975 | X | no | 2.47 | Compar. |
| 312-15 | 64 | 2.2 | 1029 | X | no | 4.04 | Compar. |

Figure 3:
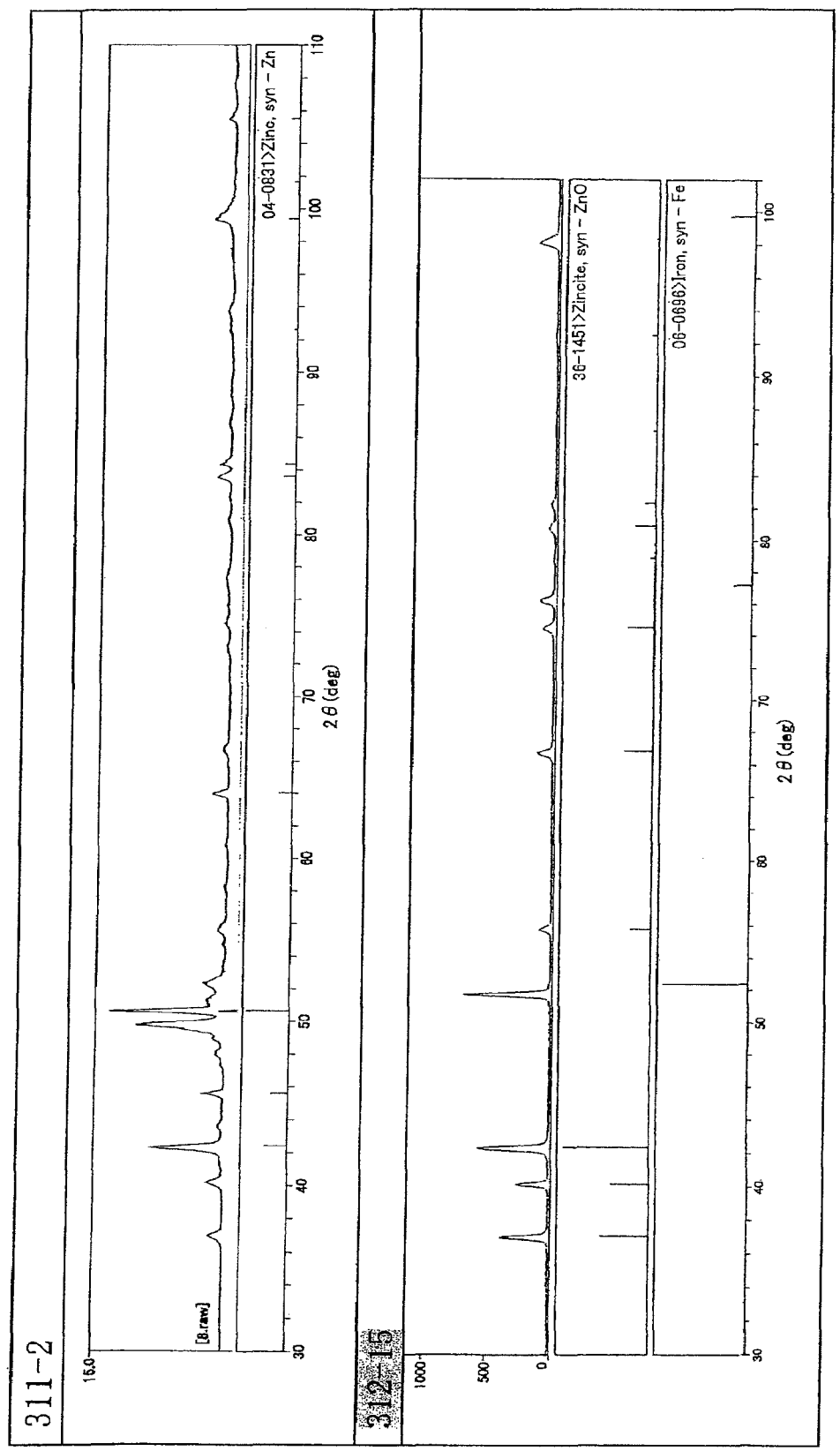
FIG. 3 shows graphs of the X-ray diffraction strength of test materials.
Figure 4:
FIG. 4 shows SEM images of the surface and cross section of test materials.

FIG. 3 shows graphs of X-ray diffraction strength, and FIG. 4 shows SEM images of the surface and cross sections.

From the graphs in FIG. 3, it can be seen that an η-Zn peak was detected in the example of the present invention but was not detected in a comparative example in which only ZnO and α Fe were detected.

As shown in Table 2 and FIG. 4, by satisfying the conditions prescribed by the present invention, it is possible to manufacture a bent metal member having a Zn-based layer with a good appearance.

Example 2

A heat treatment test was carried out in the same manner as in Example 1. The material being treated and the working and heat treatment apparatus were the same as in Example 1. In Example 2, thermocouples were attached to the same steel tube at four locations in the circumferential direction, and the surface condition at each location was investigated.

In addition to the categories for investigating the surface condition used in Example 1, the following category was investigated by the following method.

(Coating Composition)

A heat treated round tube with a coating layer was immersed in an aqueous 10% hydrochloric acid solution to which an inhibitor was added (1 gram per liter of 700 BK manufactured by Asahi Chemical Co., Ltd.) to dissolve the coating layer, and the resulting solution was analyzed by ICP spectral analysis and atomic absorption to determine the coating weight and composition of the coating layer. The results are shown in Table 3.

In this measurement method, Zn oxides present on the coating layer and scale and a Fe—Zn solid solution phase which may present in admixture with the coating layer dissolve together, so they are reflected in the measured values but are not excluded from the values.

TABLE 3

| Mark | Rate of temp. increase (° C./sec) | Holding time (sec) | Peak metal temp. (° C.) | Coating weight (g/m²) | Fe % (wt %) | η phase | Roughness Ra (μm) | Remark |
|---|---|---|---|---|---|---|---|---|
| Range of invention | At least 300 | at most 2.0 | at least Ac₃ | | | yes | At most 2.0 | |
| 392-3 | 530 | 0 | 789 | 54.5 | 13.5 | yes | 0.69 | Compar. |
| 392-4 | 530 | 0.242 | 826 | 55.9 | 13.5 | yes | 0.78 | Inventive |
| 392-5 | 530 | 0.35 | 869 | 53.4 | 13.4 | yes | 0.84 | Inventive |
| 392-6 | 530 | 0.402 | 896 | 50.0 | 12.4 | yes | 1.00 | Inventive |
| 392-8 | 530 | 0.498 | 943 | 50.1 | 11.9 | yes | 1.96 | Inventive |
| 392-9 | 530 | 0.624 | 994 | 34.8 | 14.5 | yes | 2.80 | Compar. |
| 392-17 | 530 | 0.778 | 1013 | 23.4 | 17.2 | yes | 3.46 | Compar. |
| 392-15 | 530 | 0.816 | 1119 | 8.5 | 89.1 | yes | 2.45 | Compar. |

From the results shown in Table 3, it can be seen that the examples of the present invention has a prescribed coating weight.

The invention claimed is:

1. A method of manufacturing a bent metal member characterized by
supporting the outer surface of a tubular metal material having on its surface a Zn—Fe alloy coating layer which satisfies the following Condition 1 at two locations spaced in the axial direction of the metal material so that the metal material can move in its axial direction,
feeding the metal material in its axial direction,
heating the metal material at a position between the two locations to a temperature range of at least the Ac₃ point at a heating speed such that the rate of temperature increase is at least $3.0 \times 10^{2}$° C. per second, performing holding so that the length of time for which the surface of the metal material is at a temperature of $8.0 \times 10^{2}$° C. or higher is at most 2 seconds, and then performing rapid cooling, and
imparting a bending moment to the portion of the metal material which underwent the heating by two-dimensionally or three-dimensionally varying the position of one of the two locations which is located downstream in the feed direction of the metal material,
thereby manufacturing a bent metal member having on its surface a Zn-based layer which contains an η phase and which satisfies the following Condition 2:
Condition 1
Coating weight: 30-90 g/m² per side
Fe content: 8-20 mass %

Surface roughness Ra prescribed by JIS B 0601: at most 0.8 μm;

Condition 2
Coating weight: at most 90 g/m² per side
Fe content: 8-35 mass %
Surface roughness Ra prescribed by JIS B 0601: at most 2.0 μm.

* * * * *